United States Patent
Yoshida et al.

(10) Patent No.: US 6,213,550 B1
(45) Date of Patent: Apr. 10, 2001

(54) VEHICLE SEAT

(75) Inventors: Yuichi Yoshida, Tokyo; Syunji Takazawa, Ota, both of (JP)

(73) Assignees: Fuji Jukogyo Kabushiki Kaisha, Tokyo; NHK Spring Co., Ltd., Yokohama, both of (JP)

( * ) Notice: Subject to any disclaimer, the term of this patent is extended or adjusted under 35 U.S.C. 154(b) by 0 days.

(21) Appl. No.: 09/332,468

(22) Filed: Jun. 14, 1999

(30) Foreign Application Priority Data

Jun. 16, 1998 (JP) .................................................. 10-168694

(51) Int. Cl.$^7$ ....................................................... B60N 2/42
(52) U.S. Cl. .................................. 297/216.13; 297/216.1; 280/730.2
(58) Field of Search ........................... 297/216.13, 216.1; 280/730.2, 730.1, 728.3

(56) References Cited

U.S. PATENT DOCUMENTS

| | | | |
|---|---|---|---|
| 5,860,673 | * | 1/1999 | Hasegawa et al. ......... 297/216.13 X |
| 5,904,370 | * | 5/1999 | Steiner et al. ................ 280/730.2 X |
| 5,938,232 | * | 8/1999 | Kalandek et al. ................ 280/730.2 |
| 5,967,546 | * | 10/1999 | Homier et al. ..................... 280/730.2 |
| 5,967,603 | * | 10/1999 | Genders et al. ................... 280/730.2 |
| 6,003,938 | * | 12/1999 | Lachat et al. .................... 297/216.13 |
| 6,045,151 | * | 4/2000 | Wu .............................. 297/216.13 X |
| 6,074,003 | * | 6/2000 | Umezawa et al. ............ 280/730.2 X |
| 6,095,602 | * | 1/1999 | Umezawa et al. .......... 297/216.13 X |

* cited by examiner

Primary Examiner—Laurie K. Cranmer
(74) Attorney, Agent, or Firm—Frishauf, Holtz, Goodman, Langer & Chick, P.C.

(57) ABSTRACT

In a vehicle seat containing an airbag apparatus in a seat back, a cover member for covering a side portion storing the airbag apparatus is constituted by a plurality of cover elements. The cover elements are made of material having different elongation percentages in a length direction and a width direction and sewn together to constitute the cover member. The cover element located on a front surface of the side portion is obtained by cutting the material such that the less extendible direction corresponds to a width direction of the seat back, and the cover element located on a side surface of the side portion is obtained by cutting the material such that the less extendible direction corresponds to a back-forth direction of the seat back. The cover elements are sewn together in a sewing portion extending in a vertical direction. The sewing portion is cut, when the airbag is expanded.

5 Claims, 4 Drawing Sheets

VEHICLE SEAT

BACKGROUND OF THE INVENTION

The present invention relates to a vehicle seat including a side airbag effective for protecting a passenger on a vehicle such as an automobile, when the vehicle receives side impact.

An airbag apparatus mounted on a vehicle, such as an automobile, is an apparatus which instantaneously inflates an airbag by means of an inflator in case of collision, to protect a passenger by preventing him or her from second collision with an interior member of the vehicle. To protect the passenger from head-on collision, an airbag is amounted in front of the passenger, i.e., in the center pad of the steering wheel, or near the glove box in front of the assistant driver's seat. A so-called side airbag, incorporated in a seat back or the like, is effective for side impact.

FIGS. 7 and 8 shows a side airbag apparatus 1 provided in a conventional vehicle seat 2. The vehicle seat 2. incorporates an inflator 5 in a side portion 4 of a seat back 3 on the side nearer to a door. The inflator 5 is operated in response to a signal output from a sensor when the vehicle receives side impact, so that the airbag 6 is inflated by gas generated by the inflator 5. As shown in FIG. 8, the seat back 3 includes a frame 7, a pad 8, a cover member 9, etc. As the airbag 6 is inflated, a sewing thread 11 of a sewing portion 10 between a seat-back front cover element 9a and a side cover element 9b is cut by pressure developed inside and applied to the cover member 9. Then, the airbag 6 expands forward from the seat back 3 through the cut portion, as indicated by the two-dots-chain line B, and expands to a shape which can protect side and head portions of the passenger.

In the conventional seat back 3, the cover member 9 covering the pad 8 is made of artificial leather such as vinyl leather, or cloth such as woven fabric or knit fabric. The cover member 9 is manufactured as follows. First, rolled material 15A (a roll of a long sheet-like material 15) as shown in FIG. 9 is cut into shapes of the cover elements: the seat back front cover element 9a, the side cover element 9b, etc. Then, the cover elements are sewn together. According to the knitting structure of jersey, etc., constituting the lining fabric of the material 15 made of artificial leather or the like, the material 15 extends less in the longitudinal direction of the rolled material 15A (hereinafter referred to as the length direction, indicated by the arrow L) than in the lateral direction thereof (the width direction, indicated by the arrow W). For example, when the material is cut, the elongation percentage in the length direction L is 40 to 45%, while that in the width direction W is 230 to 240%.

To manufacture the cover member 9 of the conventional seat back 3 shown in FIG. 7, the seat-back front cover element 9a and the side cover element 9b are cut out from the rolled material 15A, such that the longitudinal directions of the elements 9a and 9b correspond to the length direction L of the material 15, as shown in FIG. 9. Therefore, the seat-back front cover element 9a and the side cover element 9b, after sewn together, extend less in the vertical direction of the seat back 3 than in the width direction and the back-forth direction thereof.

In the case where the cover member 9 extends less in the vertical direction than in the width direction and the back-forth direction thereof as in the conventional seat back 3 described above, when the airbag 6 is expanding forward as indicated by the two-dots-chain line B in FIG. 8, the cover member 9 tends to expand in the width direction of the seat back 3 as indicated by the dot-chain line C. For this reason, the force for cutting the sewing thread 11 of the sewing portion 10 between the seat-back front cover element 9a and the side cover element 9b may not be fully exerted on the sewing thread 11. In this case, a portion other than the sewing portion 10, for example, a portion of the side cover element 9b may be torn and the airbag 6 may be expands from that portion, resulting in a low inflating property of the airbag 9.

BRIEF SUMMARY OF THE INVENTION

It is accordingly an object of the present invention to provide a vehicle seat, wherein, when an airbag is expanded, a predetermined portion of an airbag storage section is cut, so that a normal inflating property can be obtained.

According to the present invention, there is provided a vehicle seat containing in a seat back an airbag which is expanded by an inflator, wherein a cover member for covering an airbag storage section of the seat back is constituted by a plurality of cover elements made of material having different elongation percentages in length and width directions, and the cover elements are obtained by cutting the material and sewn together to constitute the cover member, such that a less extendible direction of the material corresponds to a direction of expansion of the airbag. In other words, the cover elements are obtained by cutting the material and sewn together such that the less extendible direction crosses a sewing portion between the cover elements.

More specifically, the seat-back front cover element located on a front surface of a side portion of the seat back is obtained by cutting the material such that the less extendible direction of the material corresponds to a width direction of the seat back, and the side cover element located on a side surface of the side portion is obtained by cutting the material such that the less extendible direction of the material corresponds to a back-forth direction of the seat back, and the cover elements are sewn together in a sewing portion extending in a vertical direction.

In the vehicle seat according to the present invention, the inflator is operated at the time of side impact, with the result that gas is blown to expand the airbag and the pressure of the expanded airbag is exerted to the cover member from the inside. Since the cover member is made of a material extendible less in the direction of expansion of the airbag, the sewing thread or the like in a predetermined sewing portion is cut, so that the side cover element, etc., may not be torn. Therefore, the airbag is expanded stably in a proper direction, thereby moderating the second collision between the passenger and the interior member of the vehicle. In this specification, the airbag represents a bag-shaped member which is expanded by gas, e.g., nitrogen gas. The gas used to expand the airbag is not limited to nitrogen.

With the vehicle seat of this invention, when the airbag incorporated therein is expanded, a desired position, for example, a predetermined sewing portion, can be cut. Thus, the direction of expansion of the airbag is stabilized, so that the normal inflating property can be exhibited.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to FIGS. 1 to 6.

Figure 1:
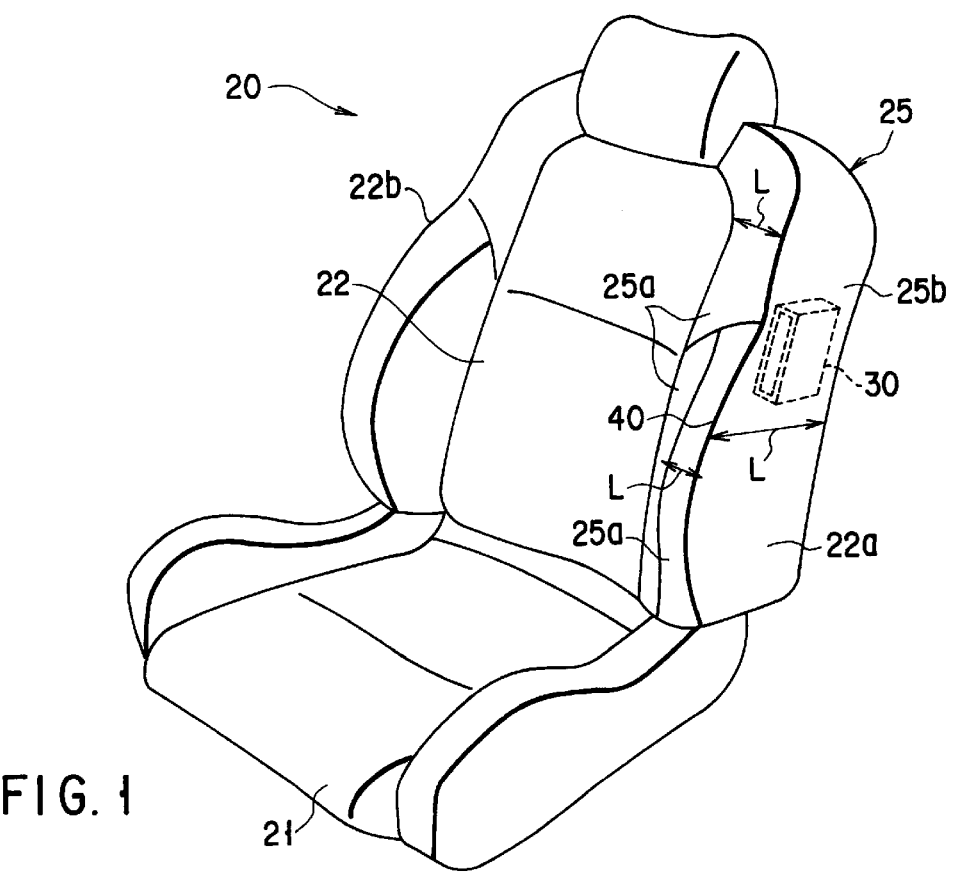
FIG. 1 is a perspective view of a vehicle seat comprising an airbag according to an embodiment of the present invention.
Figure 2:
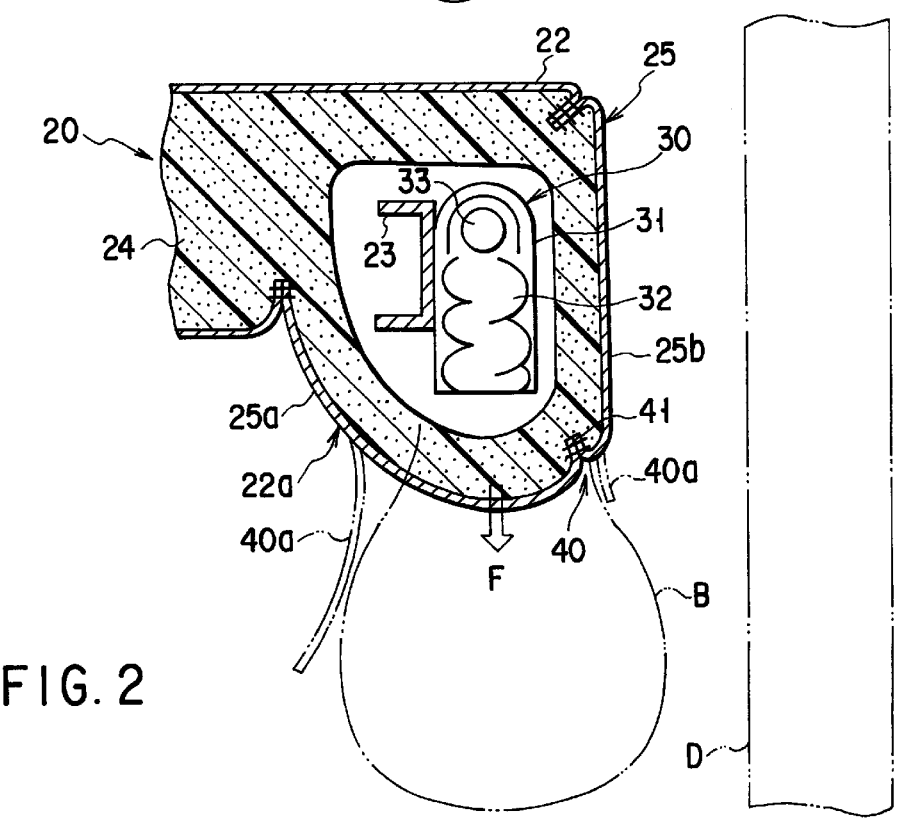
FIG. 2 is a lateral cross-sectional view of a part of the seat back of the vehicle seat shown in FIG. 1.
Figure 3:
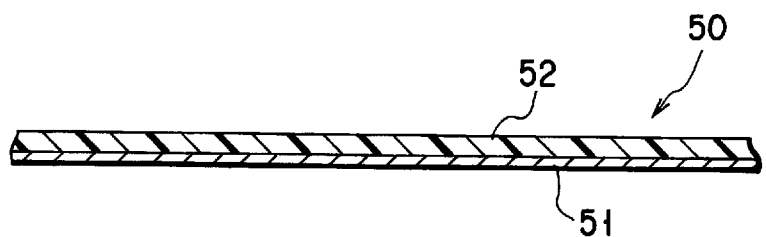
FIG. 3 is a cross-sectional view of a part of the cover member of the vehicle seat shown in FIG. 1.

FIG. 1 shows a vehicle seat 20 applicable to a front seat of an automobile. The vehicle seat 20 comprises a seat cushion 21 and a seat back 22. As shown in FIG. 2, the seat back 22 comprises a seat back frame 23, a pad 24 made of, for example, urethane foam, and a cover member (front seat trim cover) 25 covering the seat back frame 23, the pad 24, etc.

Referring to FIG. 2, an airbag apparatus (side airbag module) 30 is incorporated in a side portion 22a of the seat back 22 on the side nearer to a door D (only a part of which is shown). The airbag apparatus 30 comprises a case 31 fixed to the seat back frame 23, an airbag 32 folded and contained within the case 31, and an inflator 33 for generating inflating gas such as nitrogen gas.

The case 31 also serves as a guide member for restricting the direction of blow of the inflating gas. The pad 24 may include, a weak portion in a position in front of the case 31 from which the inflating gas is to be blown out, so that the airbag 32 can be easily expanded forward (in the direction indicated by the arrow F). The airbag apparatus also includes a sensor for detecting side impact on the vehicle and a power source (not shown), which constitute an ignition system of the inflator 33.

Figure 4:
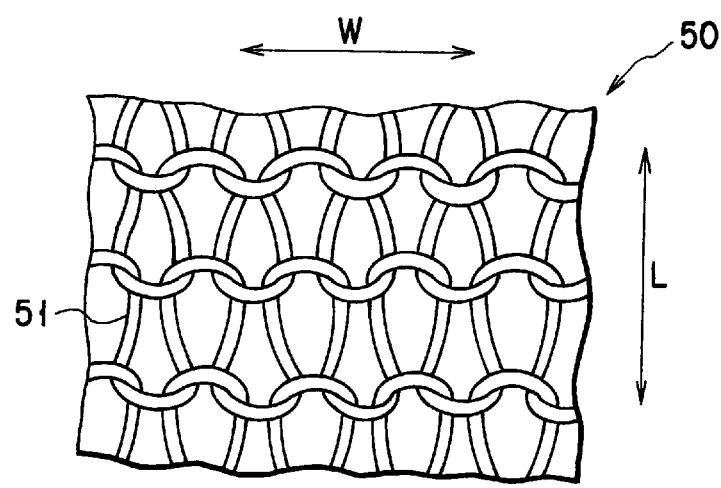
FIG. 4 is a plan view of the lining fabric of the cover member shown in FIG. 3.

The cover member 25 is made of material 50 having different elongation percentages in longitudinal and lateral directions, for example, artificial leather or fabric. The material 50 is cut into elements of predetermined shapes, which are sewn together to form the cover member 25. The cover member 25 covers the side portion 22a functioning as an airbag storage section. It is constituted by a seat-back front cover element 25a and a side cover element 25b, which are sewn together with a sewing thread 41 in a sewing portion 40 extending in the vertical direction. For example, the material 50 shown in FIG. 3 comprises lining fabric made of knit fabric 51, such as jersey as shown in FIG. 4, and an elastic material such as an elastomer layer 52 covering the outer surface of the lining fabric. With this structure, the material 50 extends less in the length direction L than in the width direction W.

Figure 5:
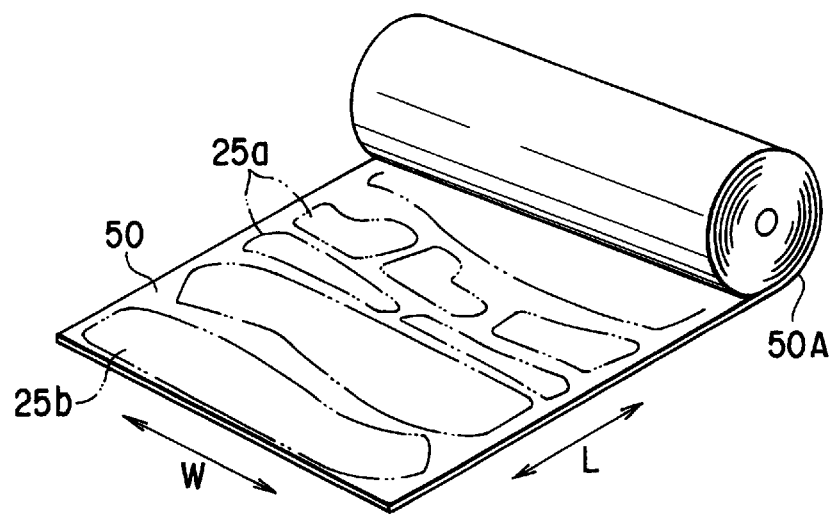
FIG. 5 is a perspective view of a roll of material of the cover member used in the vehicle seat shown in FIG. 1.
Figure 6:
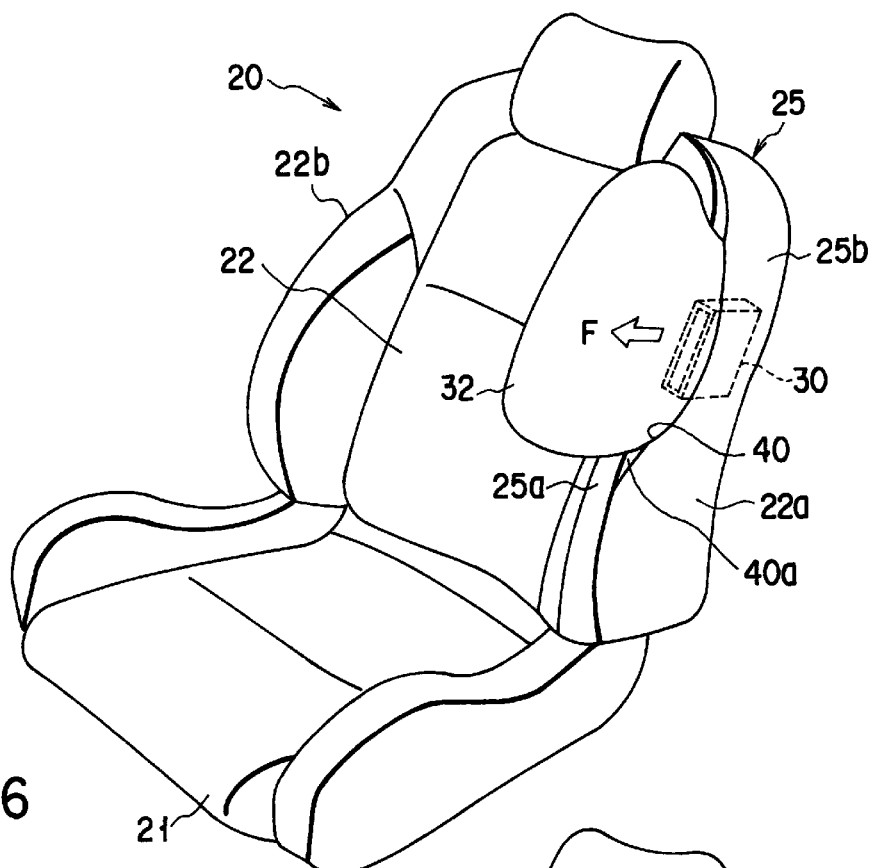
FIG. 6 is a perspective view showing an expanded state of the airbag of the vehicle seat shown in FIG. 1.

Before cutting, the material 50 is rolled into a rolled material 50A, as shown in FIG. 5. The rolled material 50A is cut into the shapes of cover elements, such as the seat-back front cover element 25a and the side cover element 25b. Therefore, these cover elements 25a and 25b extend less in the length direction L of the material 50 than in the width direction W thereof, according to the knitting structure of the material 50. For example, the elongation percentage in the length direction L, which withstands a tension fracture, is about 40%, while that in the width direction W is about 200%. Knit fabric produced by a normal knitting machine has a maximum elongation percentage of 30 to 50% in the length direction L and 150 to 250% in the width direction W. Therefore, knit fabric produced by the normal knitting machine, having elongation percentages within these ranges, can be used to achieve the object of the material 50 of the present invention.

To produce the cover member 25 of this embodiment, the seat-back front cover element 25a and the side cover element 25b are cut out from the rolled material 50A as follows. The seat-back front cover element 25a is obtained by cutting the material such that the length direction L of the material 50, which is less extendible, corresponds to the width direction of the seat back 22. The side cover element 25b is obtained by cutting the material such that the length direction L of the material 50, which is less extendible, corresponds to the back-forth direction of the seat back 22. The cover elements 25a and 25b are sewn together with the sewing thread 41 in the sewing portion 40 extending in the vertical direction. Therefore, both the seat-back front cover element 25a and the side cover element 25b after sewing have such a directional property as to extend less in the direction of expansion of the airbag. In other words, the cover elements 25a and 25b are cut from the material and sewn such that the direction of the sewing portion 40 crosses the less extendible direction L.

Figure 7:
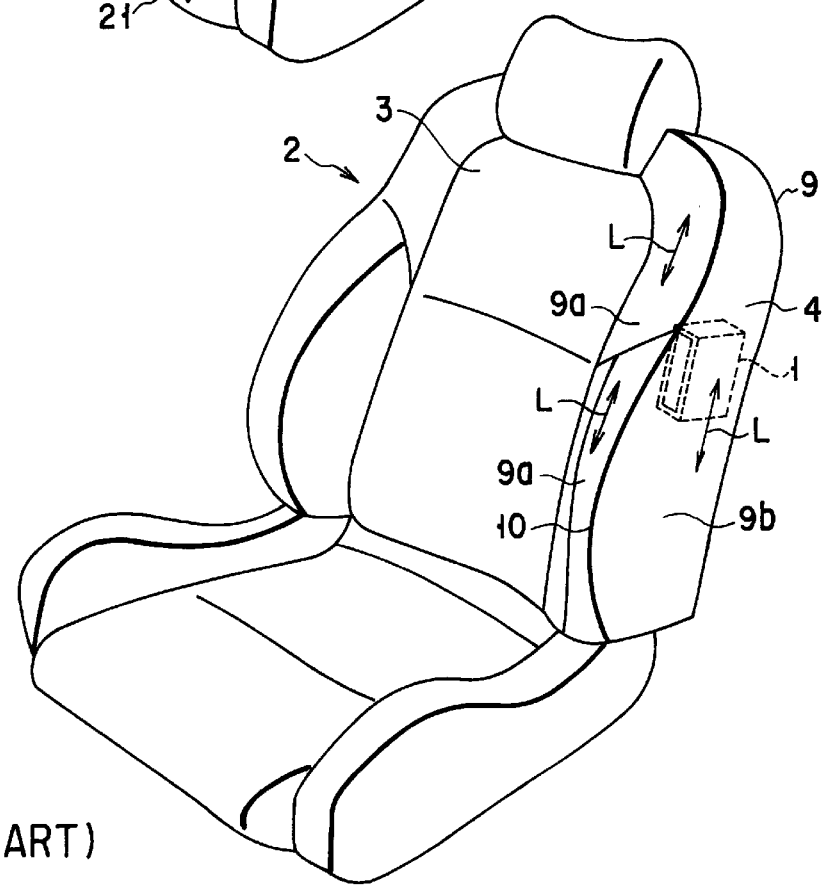
FIG. 7 is a perspective view of a conventional vehicle seat comprising an airbag.
Figure 8:
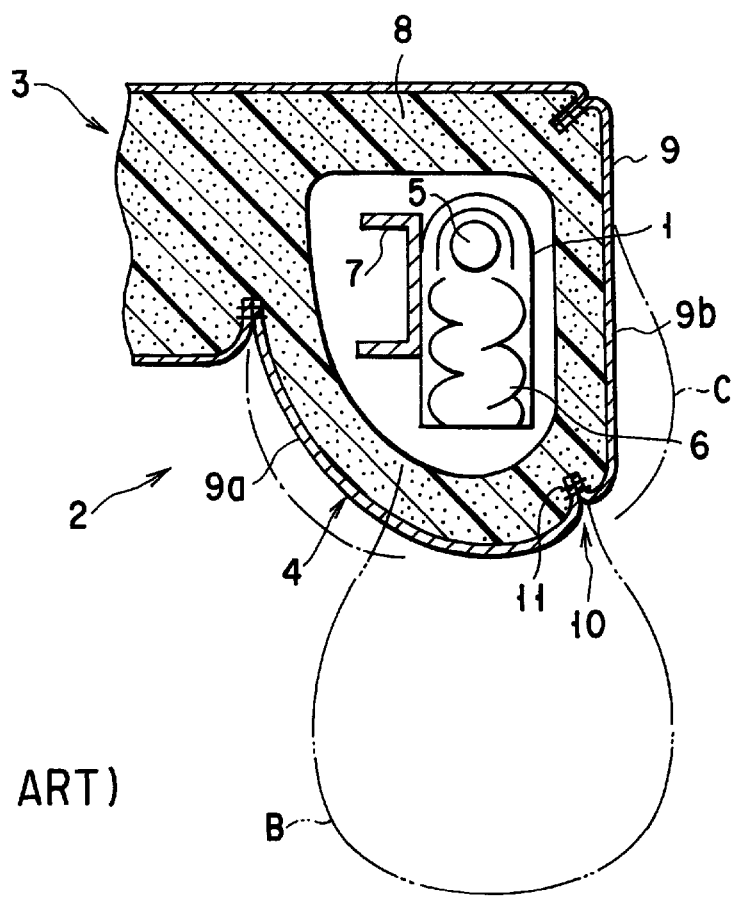
FIG. 8 is a lateral cross-sectional view of a part of the conventional vehicle seat shown in FIG. 7.
Figure 9:
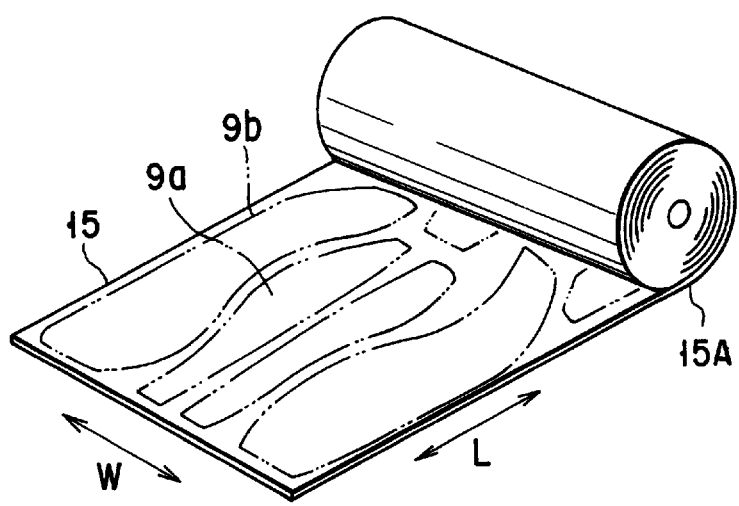
FIG. 9 is a perspective view of a roll of material of the cover member used in the seat shown in FIG. 7.

The cover elements other than the side portion 22a may have any directional property of the material. For example, the other side portion 22b located in a central portion of the vehicle may have the same directional property of the material as that of the side portion 22a. Alternatively, the side portion 22b may be made of pieces of material cut out such that the less extendible, length direction L corresponds to the vertical direction of the seat back as in the conventional seat (FIG. 7). In summary, according to the present invention, at least the cover member 25 which covers the airbag storage section (the side portion 22a on the side nearer to the door) may be made of a plurality of cover elements cut and sewn such that the direction of the sewing portion 40 crosses the less extendible direction L.

A function of the vehicle seat 20 comprising the cover member 25 and the airbag apparatus 30 will now be described.

When the vehicle receives side impact, the inflator 33 is operated in response to a signal output from the sensor for detecting collision, with the result that inflating gas such as nitrogen gas is blown from the inflator 33. The blown gas is injected into the airbag 32 in a direction controlled by the case 31.

When the airbag 32 begins to expand by the blown gas from the inflator 33, the pressure of the gas is exerted on the sewing portion 40 of the seat-back front cover element 25a and the side cover element 25b from the rear surface of the cover member 25. As described above, since the cover member 25 is constituted by the cover elements 25a and 25b having such a directional property as to extend less in the direction of expansion of the airbag, the force for cutting the sewing thread 41 of the sewing portion 40 between the cover elements 25a and 25b is directly applied to the sewing thread 41, when the airbag 32 is expanding.

Therefore, it is ensured that the sewing thread 41 of the sewing portion 40 is cut, and the airbag 32 is expanded forward (indicated by the arrow F in FIG. 6) from the seat back 22 through an opening portion 40a of the torn sewing portion 40. The expanded airbag 32 inflates in a space between a side of the body of the passenger sitting on the seat and a side wall of the interior of the vehicle (for example, the interior surface of the door D). As a result, the second collision between the passenger and the side wall of the interior of the vehicle can be moderated.

In the embodiment described above, the airbag apparatus 30 is incorporated in the seat back 22 of the assistant driver's seat 22 of an automobile with a right-hand drive. However, the same airbag apparatus 30 as described above may be incorporated in the side portion of the seat back of the driver's seat on the side nearer to the door. In this case also, the same effect can be obtained by using the same cover member as used in the embodiment described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle seat containing in a seat back an airbag which is expanded by an inflator, comprising:

an airbag storage section for storing the airbag; and a cover member for covering the airbag storage section, said cover member is constituted by a plurality of cover elements made of material having different elongation percentages in length and width directions; and the cover elements are obtained by cutting the material and sewn together to constitute the cover member, such that a less extendible direction of the material corresponds to a direction of expansion of the airbag.

2. A vehicle seat according to claim 1, wherein the cover elements are obtained by cutting the material and sewn together such that the less extendible direction crosses a sewing portion between the cover elements.

3. A vehicle seat according to claim 1, wherein the airbag storage section is a side portion of the seat back on a side nearer to a door, the cover element located on a front surface of the side portion is obtained by cutting the material such that the less extendible direction corresponds to a width direction of the seat back, and the cover element located on a side surface of the side portion is obtained by cutting the material such that the less extendible direction corresponds to a back-forth direction of the seat back, and the cover elements are sewn together in a sewing portion extending in a vertical direction.

4. A vehicle seat according to claim 1, wherein the material comprises knit fabric which extends less in a length direction than in a width direction and an elastomer layer covering an outer surface of the knit fabric.

5. A vehicle seat according to claim 1, wherein the material comprises knit fabric having elongation percentages of 30 to 50% in a length direction and 150 to 250% in a width direction.

* * * * *